United States Patent [19]

Yoneda et al.

[11] Patent Number: 4,815,000

[45] Date of Patent: Mar. 21, 1989

[54] NUMERICAL CONTROLLER WITH OPERATION HALTING FUNCTION FOR DATA REVISION

[75] Inventors: Takao Yoneda, Nagoya; Tadashi Yamauchi, Kariya; Yasuji Sakakibara, Hekinan, all of Japan

[73] Assignee: Toyoda Koki Kabushiki Kaisha, Kariya, Japan

[21] Appl. No.: 144,582

[22] Filed: Dec. 30, 1987

Related U.S. Application Data

[63] Continuation of Ser. No. 895,933, Aug. 13, 1986, abandoned.

[30] Foreign Application Priority Data

Oct. 17, 1985 [JP] Japan .................. 60-231870

[51] Int. Cl.⁴ .................... G06F 15/46; B24B 49/00
[52] U.S. Cl. .................... 364/474.34; 364/474.06; 364/474.32; 364/474.35; 364/474.14; 318/571; 51/165.71
[58] Field of Search ............... 364/167, 170, 171, 474, 364/475, 184, 185, 192; 318/565, 568, 571; 51/165.71

[56] References Cited

U.S. PATENT DOCUMENTS

| | | | |
|---|---|---|---|
| 3,898,440 | 8/1975 | Fukuma et al. | 51/165.71 |
| 4,293,913 | 10/1981 | Nishimura et al. | 364/474 |
| 4,371,941 | 2/1983 | Gordiski et al. | 318/571 |
| 4,490,946 | 1/1985 | Tsujiuchi et al. | 364/474 |
| 4,502,125 | 2/1985 | Yoneda et al. | 364/474 |
| 4,584,796 | 4/1986 | Yoneda et al. | 51/165.71 |
| 4,608,643 | 8/1986 | Breitenstin et al. | 364/474 |
| 4,740,902 | 6/1987 | Yoneda et al. | 364/474 |

FOREIGN PATENT DOCUMENTS 60-99545  6/1985  Japan .
2127583A  4/1984  United Kingdom .

Primary Examiner—John R. Lastova
Attorney, Agent, or Firm—Oblon, Fisher, Spivak, McClelland & Maier

[57] ABSTRACT

A numerical controller is provided wherein each time one data block of a numerical control program is transferred from a second buffer register to an active register, another data block successive thereto is transferred from a data storage device to a first buffer register and wherein a plunge infeed between a cylindrical workpiece and a grinding wheel of a grinding machine is effected in accordance with data block being stored in the active register. The numerical controller halts an automatic machining operation in response to a halt command of a data block in the active register. Compensation data is input during the halt of the automatic machining operation whereafter a restart command is input. The numerical controller modified feed command data of the numerical control program stored in the data storage device, based upon the compensation data. In response to the restart command, the numerical controller transfers to the first buffer register a modified data block successive to that including the halt command, whereby the grinding wheel is moved in accordance with the modified data block transferred then to the active register.

10 Claims, 9 Drawing Sheets

\*\*\* SIZE COMP. TABLE \*\*\*    ==FINISH SIZE==

WHEEL STOP POSITION : [X0]

COMMON COMP. VALUE : [H0]

|  | DIA. | COMP. VALUE |
|---|---|---|
| 1ST STEP : | [D1] | [H1] |
| 2ND STEP : | [D2] | [H2] |
| 3RD STEP : | [D3] | [H3] |
| 4TH STEP : | [D4] | [H4] |
| 5TH STEP : | [D5] | [H5] |
| 6TH STEP : | [D6] | [H6] |
| 7TH STEP : | [D7] | [H7] |
| 8TH STEP : | [D8] | [H8] |
| 9TH STEP : | [D9] | [H9] |
| 10TH STEP : | [D10] | [H10] | ns with those revised
NUMERICAL CONTROLLER WITH OPERATION HALTING FUNCTION FOR DATA REVISION This application is a continuation of application Ser. No. 895,933, filed on Aug. 13, 1986, now abandoned.

BACKGROUND OF THE INVENTION

1. Field of the Invention

The present invention relates to a numerical controller for a grinding machine capable of successively grinding a plurality of workpieces or axially spaced portions of a workpiece in accordance with a numerical control program.

2. Discussion of the Prior Art

In successively grinding workpieces in a numerical control cylindrical grinding machine, the diameter of a finished portion of a first workpiece is measured for the difference from a commanded diameter after the first workpiece is machined in accordance with a numerical control program. The difference is then used to modify plunge inwheel feed position data in the numerical control program so that a second workpiece and other workpieces successive thereto can be precisely machined to the commanded diameter. In this method, the first workpiece cannot be machined to the commanded diameter and as the case may be, has to be machined again in a manual feed mode.

To avoid this drawback, in a numerical control grinding machine, an automatic operation is halted in mid course of machining, and the operational mode of the machine is switched to a manual mode to retract a grinding wheel and then, to measure the diameter of the workpiece. Thereafter, the grinding wheel is returned to a previous infeed end position, and the position of the grinding wheel is then adjusted by a size error which can be calculated based upon the grinding wheel position and the measured diameter of the workpiece. The automatic operation is resumed upon completion of the position adjustment, so that the workpiece can be machined to a desired finish diameter.

Although in the known grinding machine, the desired finish diameter can be obtained even on a first machined workpiece, there are involved various drawbacks noted below. That is, the determination of a timing at which the automatic operation is to be halted depends on the operator, who is thus required to observe the machining operation of the first workpiece. Further, where the workpiece has a plurality of axially stepped portions which are to be successively machined in accordance with a numerical control program, revision has to be made with plunge infeed control data for all of the workpiece portions prior to the machining of a second workpiece portion, and such revision is in fact complicated and troublesome.

In addition, known numerical controllers are usually provided with one active register and two buffer registers. Thus, when a grinding operation is performed in accordance with a numerical control data block being stored in the active register, two numerical control data blocks successive to that in the active register have already been stored in the buffer registers. Consequently, after the revision of a numerical control program stored in a memory device, the data blocks in the buffer registers have to be replaced with those revised and corresponding thereto. To this end, prior to resumption of the automatic machining operation, the operator is required to search for the revised data blocks corresponding to those in the buffer registers and then, to load the searched revised data blocks in the buffer registers in place of those already therein. These manipulations by the operator make the subsequent resumption of the automatic machining operation difficult and provide a larger chance to involve errors.

SUMMARY OF THE INVENTION

Accordingly, it is a primary object of the present invention to provide an improved numerical controller which permits an operator to easily revise feed control data of a numerical control program stored in a memory device during the halt of an automatic machining operation on a first workpiece so that the revision of feed control data is not required for other successive workpieces which are to be machined in accordance with the same numerical control program. Another object of the present invention is to provide an improved numerical controller of the character set forth above which is capable of automatically halting an automatic machining operation performed in accordance with a numerical control program.

A further object of the present invention is to provide an improved numerical controller of the character set forth above which enables the operator to resume an automatic machining operation from a step next to that in which it was halted, through his simple and easy manipulation.

A still further object of the present invention is to provide an improved numerical controller of the character set forth above which is capable of preventing any numerical control data block successive to that including a halt command, from being transferred to a buffer register after that including the halt command is transferred to the buffer register.

An additional object of the present invention is to provide an improved numerical controller of the character set forth above capable of enabling the operator to selectively validate and invalidate a halt command which is given in a numerical control program for halting an automatic machining operation performed in accordance with a numerical control program.

Briefly, in a numerical controller according to the present invention, each time one data block of a numerical control program is transferred by first data transfer means from buffer register means to an active register, another data block successive thereto is transferred by second data transfer means from a data storage device to the buffer register means. Feed control execution means is responsive to the data block being stored in the active register for controlling relative plunge infeed between a cylindrical workpiece and a grinding wheel of a grinding machine. Halt control means is responsive to a halt command of a data block in the active register for halting an automatic machining operation performed in accordance with the numerical control program. During the halt of the automatic machining operation, compensation data input means is manipulated to input compensation data. Data modification means modifies feed command data of the numerical control program stored in the data storage device based upon the compensation data input by the compensation data input means prior to the transfer of any data block to the buffer register means. Restart command means generates a restart command after the compensation data is input. Restart control means is further provided, which responds to the restart command so as to enable the second data transfer means to transfer to the buffer register means a data block successive to that including the halt command.

With this configuration, the automatic machining operation is automatically halted by the halt control means, and thus, an operator of the grinding machine is relieved of observing the grinding operation and of determining the timing when the automatic machining operation is to be halted. Further, since feed command data of the numerical control program is modified based upon the compensation data which is input during the halt of the automatic machining operation, not only a first workpiece but also a second workpiece and those following can be precisely machined to a desired or programmed finish size.

In another aspect of the present invention, advance read inhibition means is further provided, which inhibits the second transfer means to transfer any data block of the numerical control program to the buffer register means after a data block including the halt command is transferred to the buffer register means. Thus, the resumption of the automatic machining operation can be performed easily and reliably because no data block is stored in the buffer register means at the resumption.

In a further aspect of the present invention, compensation data input means is arranged to input a common compensation value and individual compensation values. The common compensation value is used to adjust relative position between the grinding wheel and the workpiece in grinding each of the workpiece portions, while each of the individual compensation values is used to adjust the wheel-workpiece relative position in grinding a corresponding one of the workpiece portions. This configuration advantageously makes the inputting of the compensation data easy and avoids errors which may otherwise be involved in inputting the compensation data.

BRIEF DESCRIPTION OF THE ACCOMPANYING DRAWINGS

Various other objects, features and many of the attendant advantages of the present invention will be readily appreciated as the same becomes better understood by reference to the following detailed description of a preferred embodiment when considered in connection with the accompanying drawings, wherein like reference numerals designate identical or corresponding parts throughout the several views, and in which:

FIG. 2 is an explanatory view showing one example of a numerical control program used in automatically machining a plurality of axially stepped portions of a workpiece;

FIG. 11 is an explanatory view showing an image displayed on a CRT display unit 38 shown in FIG. 1 in inputting compensation data.

DETAILED DESCRIPTION OF THE PREFERRED EMBODIMENT

Figure 1:
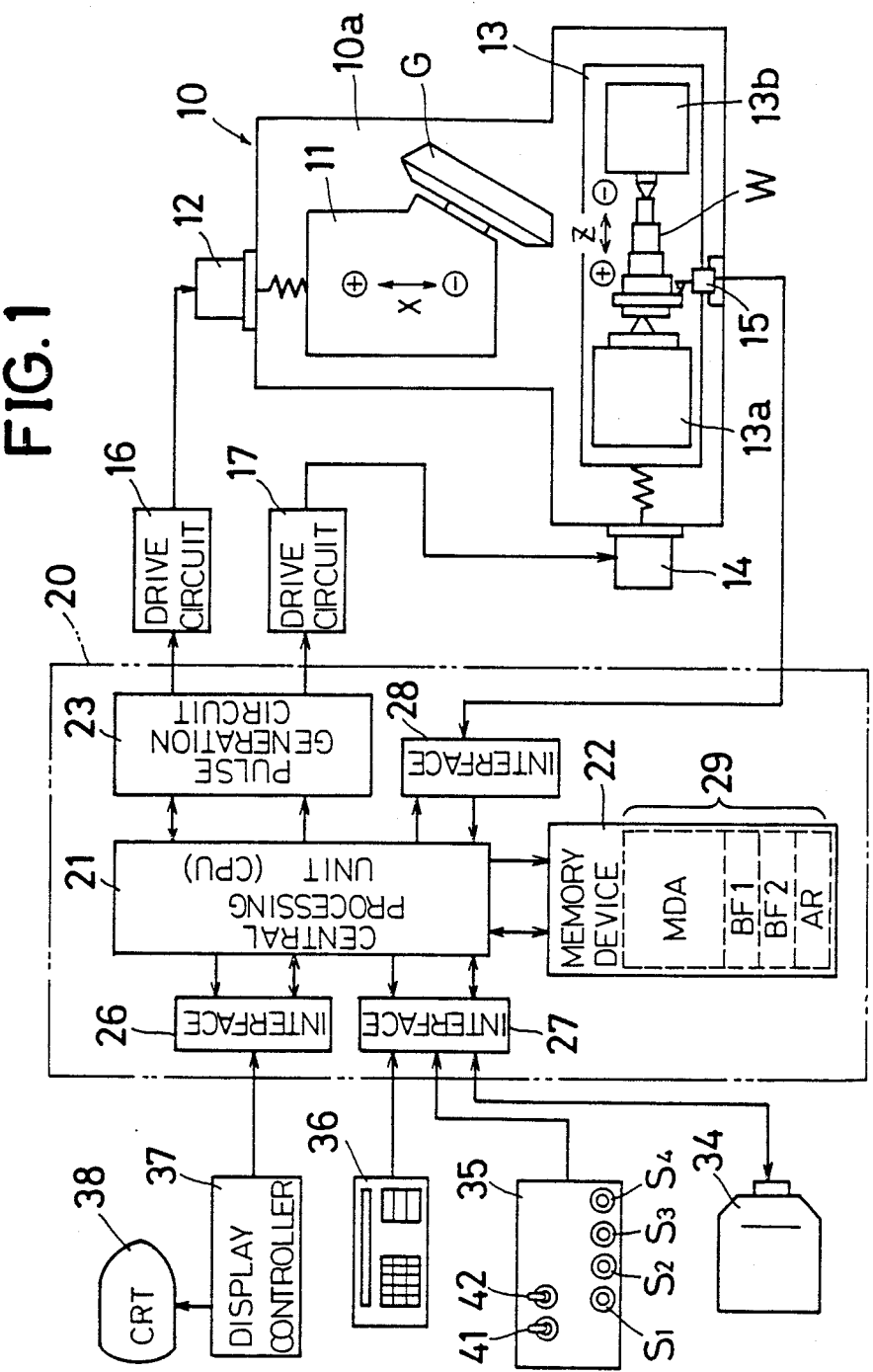
FIG. 1 is a block diagram of a numerical controller according to the present invention, also showing a schematic plan view of a grinding machine controlled by the numerical controller.

Referring now to the drawings and particularly to FIG. 1 thereof, a numerical control machine tool is shown having a grinding machine 10 and a numerical controller 20. The grinding machine 10 is provided with a wheel head 11 rotatably carrying a grinding wheel G and a work table 13 on which a headstock 13a and a tailstock 13b are mounted for rotatably carrying a workpiece W. The wheel head 11 and the work table 13 are mounted on a bed 10a to be movable in X and Z-axis directions perpendicular to each other and are drivingly connected with servomotors 12, 14 driven by drive circuits 16, 17, respectively. The grinding machine 10 is also provided with a sizing device 15 for positioning the workpiece W in an axial direction thereof.

The numerical controller 20 is composed of a central processing unit (hereafter referred to as "CPU") 21, a memory device 22, a pulse generation circuit 23, and interfaces 26–28. The circuit 23 is connected t apply feed pulses generated thereby to the drive circuits 16, 17. The memory device 22 is composed of a read-only memory (ROM) section, not shown, and a random access memory (RAM) section 29. The ROM section has stored therein system control programs described later with reference to 5–7, 9 and 10. The RAM section 29 is formed therein with a machining data storage area MDA for storing a numerical control program (hereafter referred to as "NC program") and numerical data which are assigned to various parameters designated in the NC program. Further, a first buffer register BF1, a second buffer register BF2 and an active register AR are formed in the RAM section 29. The interface 26 is coupled to a display control circuit 37 for driving a CRT display unit 38. The interface 27 is coupled to a data input device 36 for inputting various data in the memory device 22, a bubble cassette memory 34 for semipermanent storage of the NC program, and a control panel 35 for inputting various commands. The NC program is input using the CRT display unit 38 and the data input device 36 and is stored in the machining data area MDA.

Figure 2:
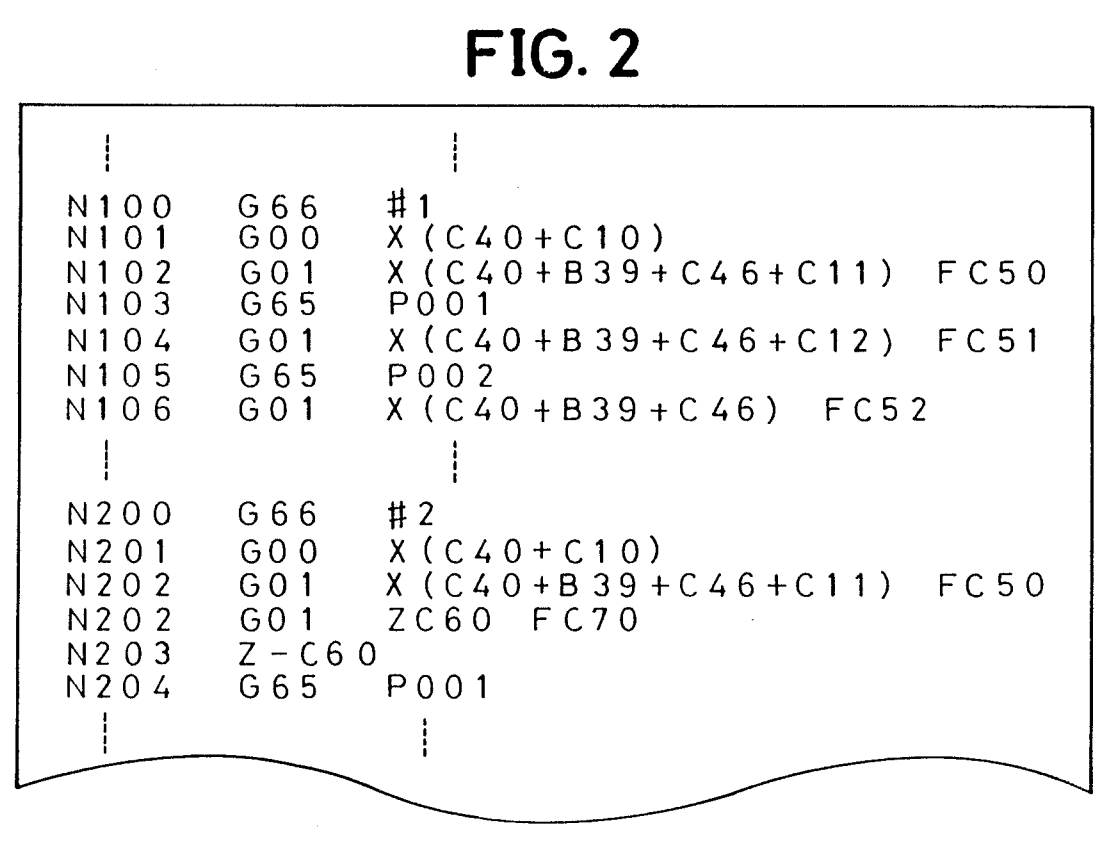
Figure 3:
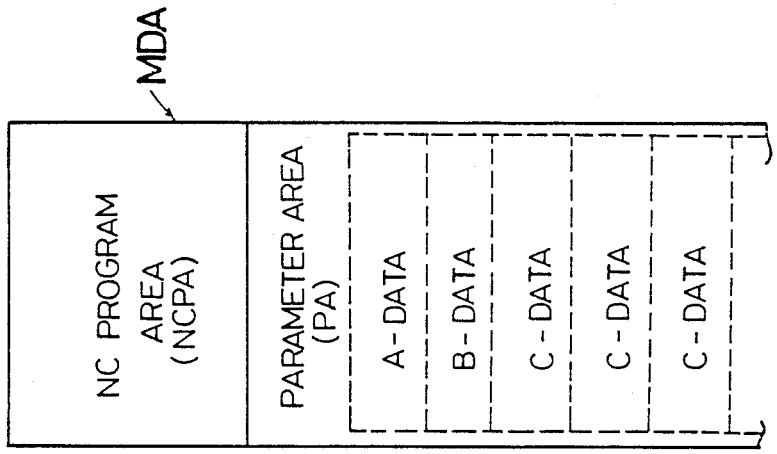
FIG. 3 is an explanatory view illustrating the configuration of a machining data storage area MDA formed in a memory device shown in FIG. 1.

The NC program is composed of a plurality of data blocks designated by sequence numbers, e.g., N100, N101, N103 . . . , as exemplified in FIG. 2. Of the data blocks, each of those which are used in controlling plunge infeeds of the grinding wheel G toward axially stepped portions of the workpiece W does not include a real feed position data and instead, includes one or more parameters (e.g., C40, C10, B39, C46) each representing real feed position data. Each plunge infeed of the grinding wheel G toward one of the workpiece portions is composed of several infeed segments such as, rapid feed, rough grinding feed, fine grinding feed and microgrinding feed. Thus, each NC data block for plunge infeed prescribes one of the infeed segments, and a real infeed end of the grinding wheel G in each infeed segment is defined by feed end position data represented by a single parameter or by the sum of several feed end position data represented by several parameters. Similarly, a feed rate in each infeed segment is also defined by feed rate data represented by a parameter (e.g., C50, C51, C52). As shown in FIG. 3, the machining data storage area MDA is formed with an NC program area NCPA for storing the NC program and a parameter area PA for storing those parameters designated in the NC program and compensation values.

The control panel 35 is provided thereon with switches 41 and 42 each for validating or invalidating a halt command code "G65" given in several data blocks of the NC program. The control panel 35 is further provided with a start switch S1 for starting an automatic operation of the numerical controller 20, a retraction command switch S2 for retracting the grinding wheel G a predetermined distance during the halt of the automatic operation, an advance command switch S3 for advancing the grinding wheel G the predetermined distance thereafter, and a restart command switch S4 for resuming the automatic operation of the numerical controller 20 from the status in which the automatic operation was halted.

Operations of the numerical controller 20 will be described hereafter.

Figure 4:
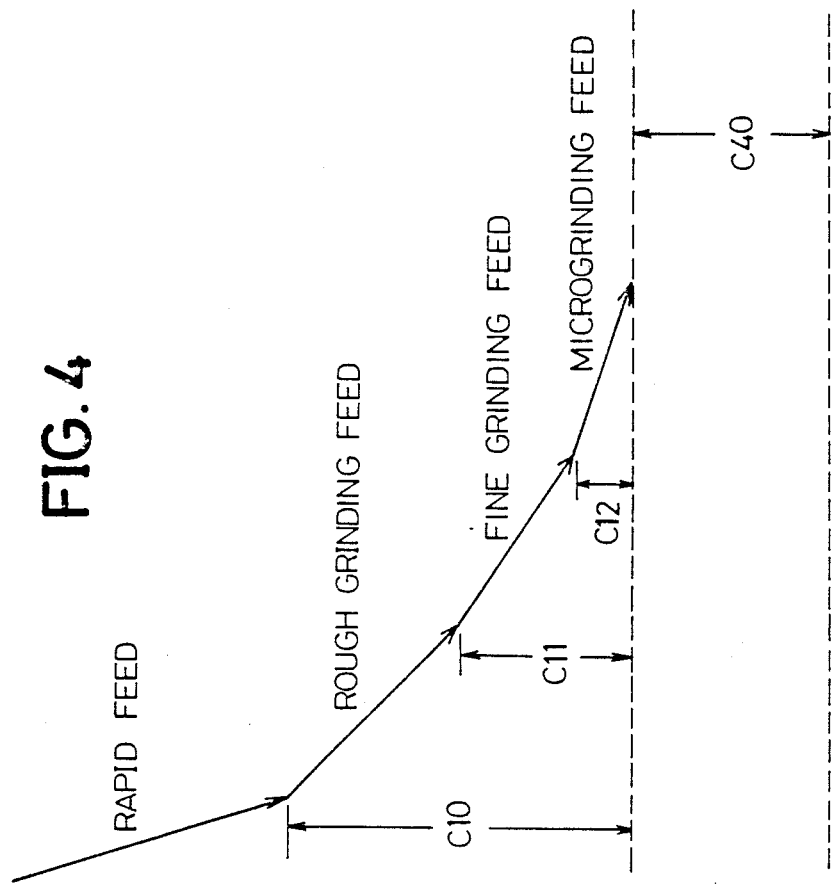
FIG. 4 is a cycle hart illustrating a plunge infeed of a grinding wheel in grinding each of the workpiece stepped portions.

Prior to the automatic operation of the numerical controller 20, the NC program and parameters designated therein are loaded from the bubble cassette memory 34 to the machining data storage area MDA of the memory device 22. The NC program exemplified in FIG. 2 includes data blocks with sequence numbers N100-N106 for machining a first stepped portion of the workpiece W and data blocks with sequence numbers N200-N204 for machining a second stepped portion of the workpiece W. Symbols "#1" and "#2" indicate machining step order numbers. The details of the machining on the first stepped portion is illustrated in FIG. 4. In the machining of the first stepped portion, a plunge infeed is effected through a rapid feed, a rough grinding, fine grinding and a microgrinding feed. Of the parameters designated in the NC program, C40 denotes a finish dimension (or radius) of each workpiece portion, C12 the difference of an end position in a fine grinding feed from the finish dimension C40, C11 the difference of an end position in a rough grinding feed from the finish dimension C40, and C10 the difference of an end position in a rapid feed from the finish dimension C40.

Further, B39 denotes a common compensation value for all of the stepped portions of the workpiece W, and C46 an individual compensation value inherent to each of the stepped workpiece portions. Of data blocks shown in FIG. 2, N101 data block prescribes a rapid feed control, N102 data block a rough grinding feed control, N103 a halt control, N104 a fine grinding feed control, N105 another halt control, and N106 data block a microgrinding feed control. Thus, when the machining on the first workpiece portion is executed in accordance with the NC program shown in FIG. 2, plunge infeed of the grinding wheel G is halted upon completion of each of the rough and fine grinding feeds, during which time compensation values can be input. Each of the above-noted parameters B39 and C46 is set to indicate an initial value "0" until it is set with a compensation value. Therefore, where no compensation value is input for each of the parameters B39 and C46, the machining operation on the first workpiece portion is performed in an initially programmed cycle shown in FIG. 4.

Figure 5:
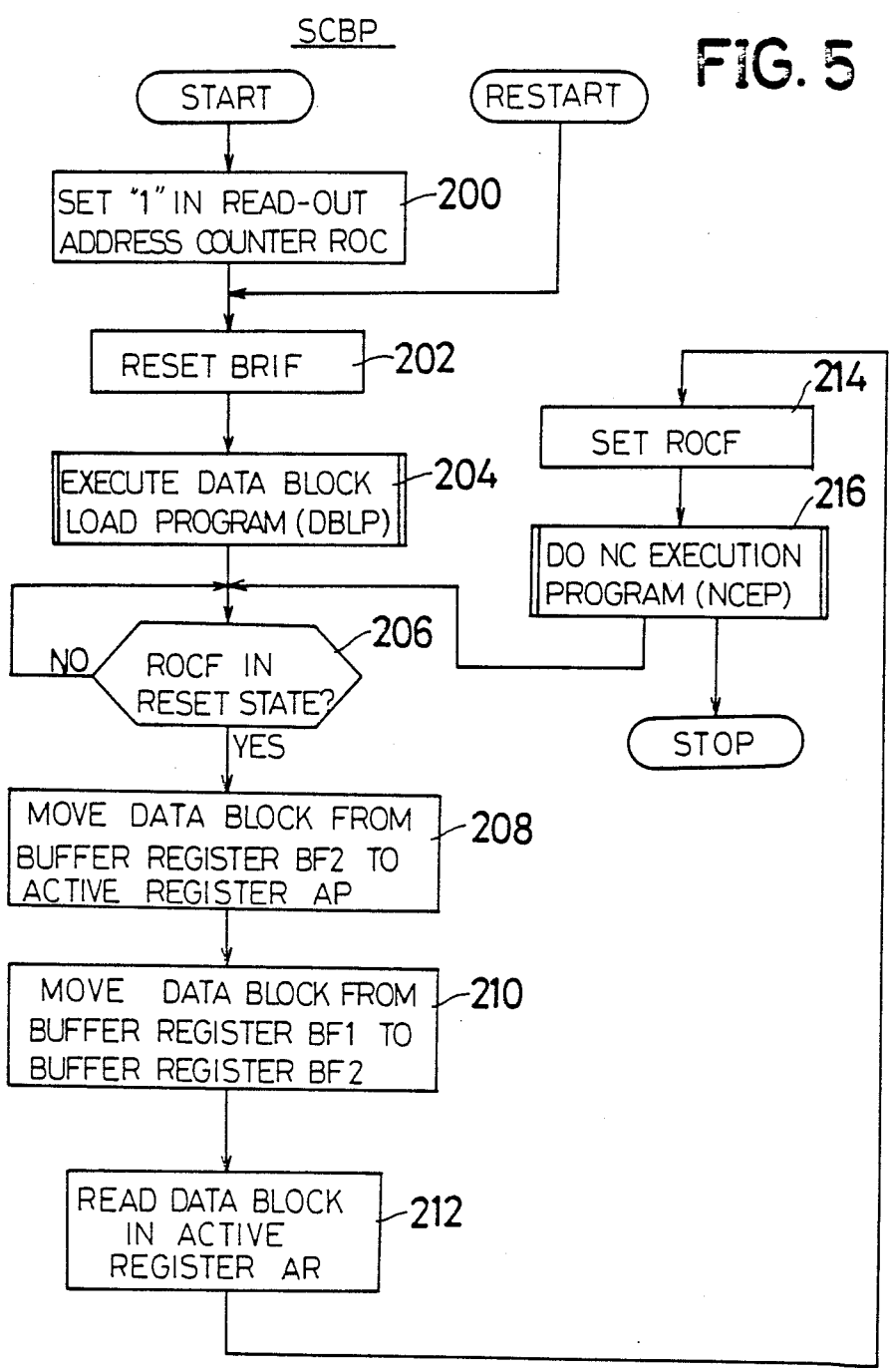
FIG. 5 is a flow chart of a system control base program executed by a central processing unit of the numerical controller in controlling the grinding machine in accordance with the numerical control program stored in the machining data storage area MDA.

A system control base program shown in FIG. 5 is executed upon depression of a start command switch S1. A read-out address counter ROC which controls the read-out of each data block of the NC program is set with an initial value "1" in step 200. Step 202 is followed wherein an advance read inhibition flag BRIF is reset to make a status in which the advance read of an NC data block is permitted. Step 204 is then reached to execute a data block load program DBLP shown in FIG. 6.

The program DBLP is used for loading the NC program to the first buffer register BF1 on a block-by-block basis. This program DBLP is executed through an interruption processing utilizing idle time periods that the CPU 21 has in the course of controlling the grinding machine 10. When it is ascertained in step 100 that the advance read inhibition flag BRIF is in a set status, return is made whereby no NC data block is loaded to the first buffer register BF1. Step 102 is for judging the status of a read-out completion flag ROCF. With the flag ROCF being in a set status, data movement from the first buffer register BF1 to the second buffer register BF2 has been completed, so that the first buffer register BF1 stores no NC data block. With the flag ROCF having been reset, on the contrary, the content of the first buffer register BF1 has not yet moved to the second buffer register BF2, and return is made without loading a further NC data block to the first buffer register BF1. When the first buffer register BF1 is vacant, step 104 is reached, wherein one data block of the NC program is read out from the machining data storage area MDA.

Ascertainment is made in step 106 of whether the read NC data block includes a halt command code G65 for halting the control of the automatic operation. Unless the code G65 is included, step 112 is then executed to load the read-out NC data block to the first buffer register BF1. Subsequently, the read-out completion flag ROCF is reset in step 114 to memorize the completion of data loading to the first buffer register BF1, and the read-out address counter ROC is incremented in step 116 to designate a memory address storing the next one block of the NC program.

Where the inclusion of the halt command code G65 is ascertained in step 106, step 108 is next reached to ascertain whether the switch 41 assigned to the stop command code G65 is ON or not. In the NC program exemplified in FIG. 2, the first NC data block which includes the halt command code G65 is indicated by sequence number N103. The data block N103 also includes data P001, which designates the switch 41. Since a halt function instructed by the code G65 is validated when the switch 41 is ON, step 110 is then reached to set the advance read inhibition flag BRIF. When the switch 41 is OFF, on the contrary, step 112 is executed without setting the flag BRIF.

Figure 6:
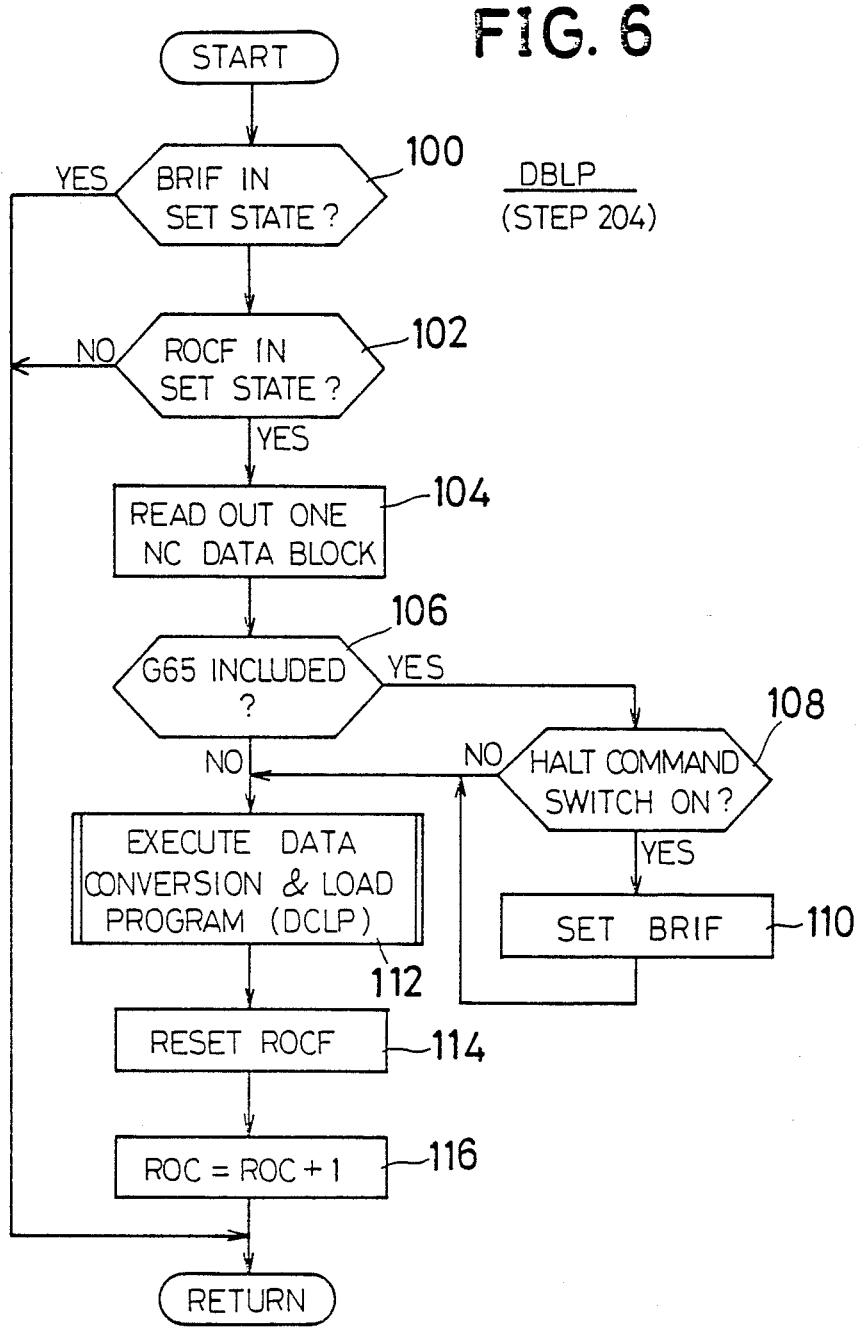
FIG. 6 is a specific flow chart of processings executed in step 204 of FIG. 5.
Figure 7:
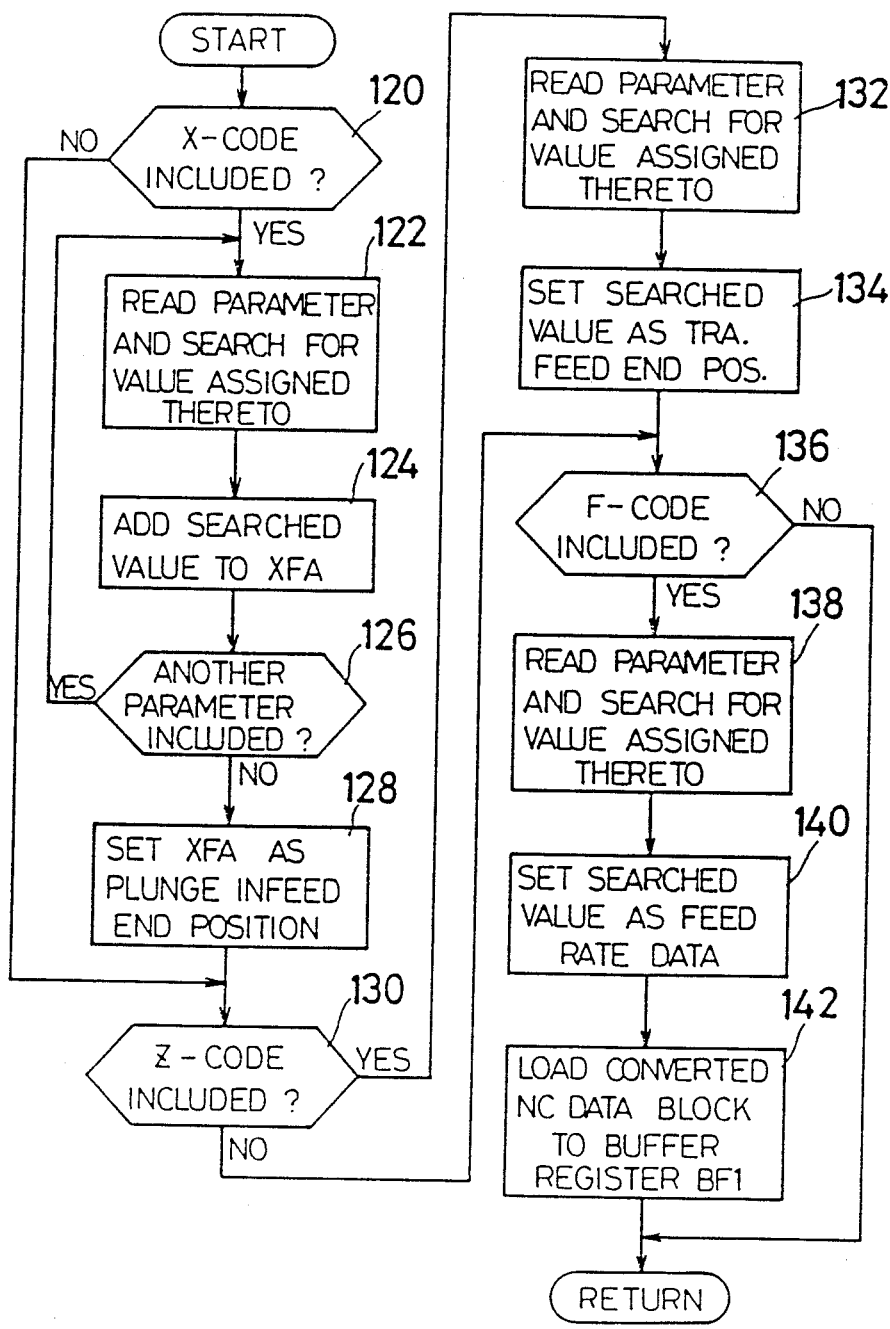
FIG. 7 is a specific flow chart of processings executed in step 112 of FIG. 6.

FIG. 7 shows a data conversion and load program DCLP executed in step 112 of FIG. 6. Before loading each NC data block to the first buffer area BF1, the CPU 21 ascertains whether the NC data block includes an X-code, a Z-code and an F-code respectively in steps 120, 130 and 136. If the X-code is included in step 120, steps 122-126 are executed several times to calculate the sum of values represented by the parameters following the X-code. In step 128, the calculated sum is set to define an infeed end of the grinding wheel G in each plunge infeed segment. If the Z-code or F-code is included in step 130 or 136, a value represented by a parameter accompanied by the code is searched for in step 132 or 138 and is set to define a traverse feed end of the work table 3 in step 134 or to define an infeed rate in step 140. Through these steps 120-140, the NC data block is converted to have a real value indicative of an infeed end position and another real value indicative of a feed rate, and the converted NC data block is then loaded to the first buffer register BF1 in step 142.

Figure 8:
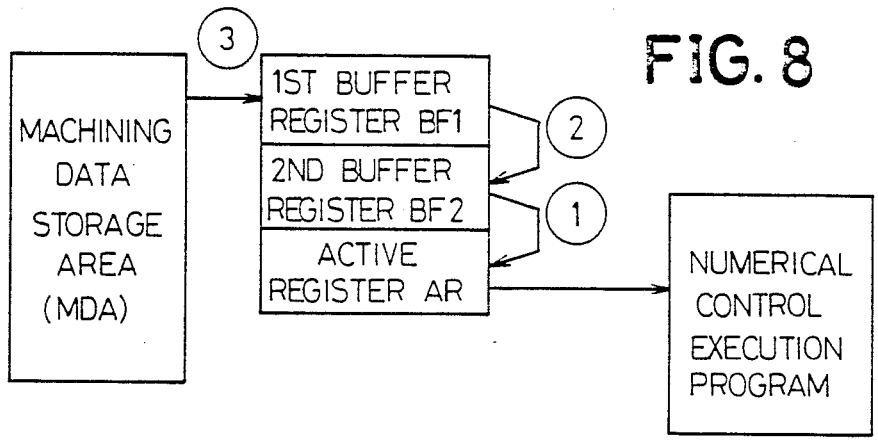
FIG. 8 is an explanatory view illustrating the transfer operation of numerical control data blocks from the machining data storage area MDA to resisters.

Upon completion of step 116, return is made to step 206 of FIG. 5 to ascertain the status of the read-out completion flag ROCF. If one NC data block has been loaded to the first buffer register BF1, processings in steps 208-210 are executed. That is, as shown in FIG. 8, the stored data in the second buffer register BF2 is moved to the active register AR, whereupon the stored data in the first buffer register BF1 is moved to the second buffer register BF2. Then, the stored data in the active register AR is read in step 212, and the read-out completion flag ROCF is set in step 214 to indicate that the first buffer register BF1 is vacant as a result of an NC data block having already been moved therefrom. Further, in step 216, each command of the NC data block read in step 212 is decoded and executed in accordance with an numerical control execution program NCEP, as described in detail hereinafter.

Figure 10:
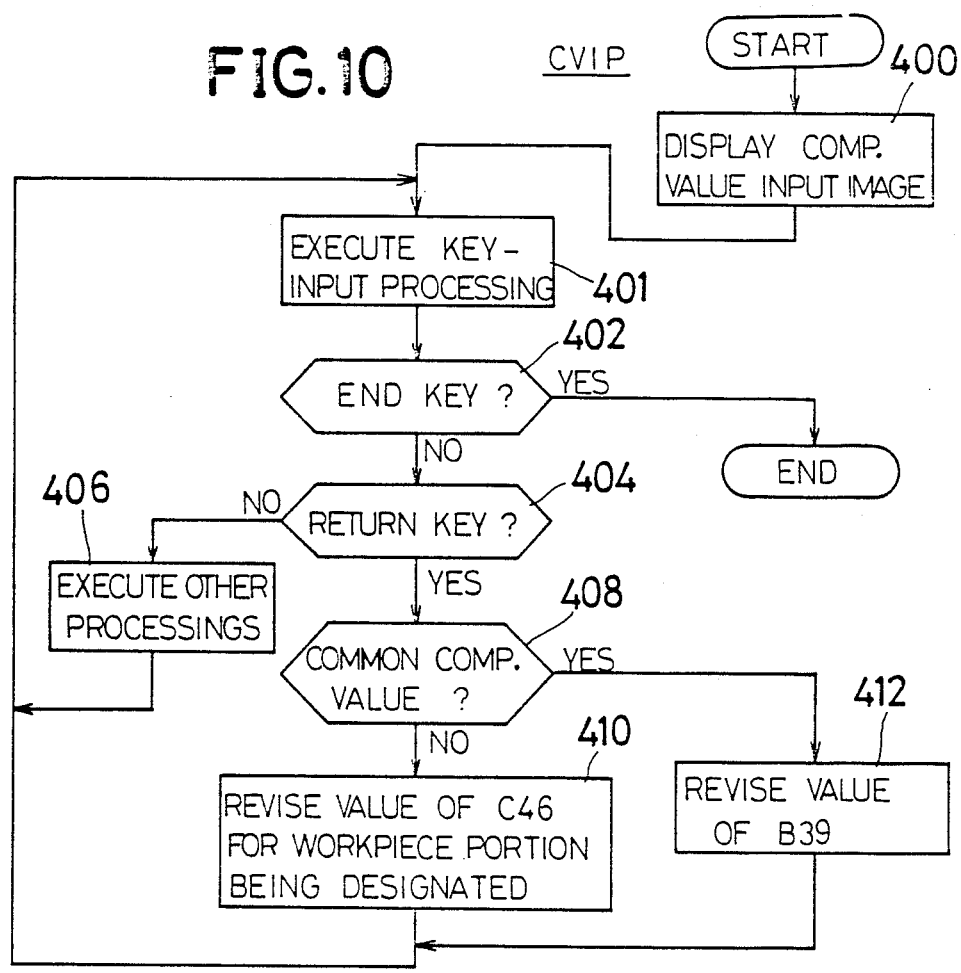
FIG. 10 is a flow chart of a compensation data input program executed by the central processing unit in inputting compensation values during the halt of an automatic machining operation.
Figure 9:
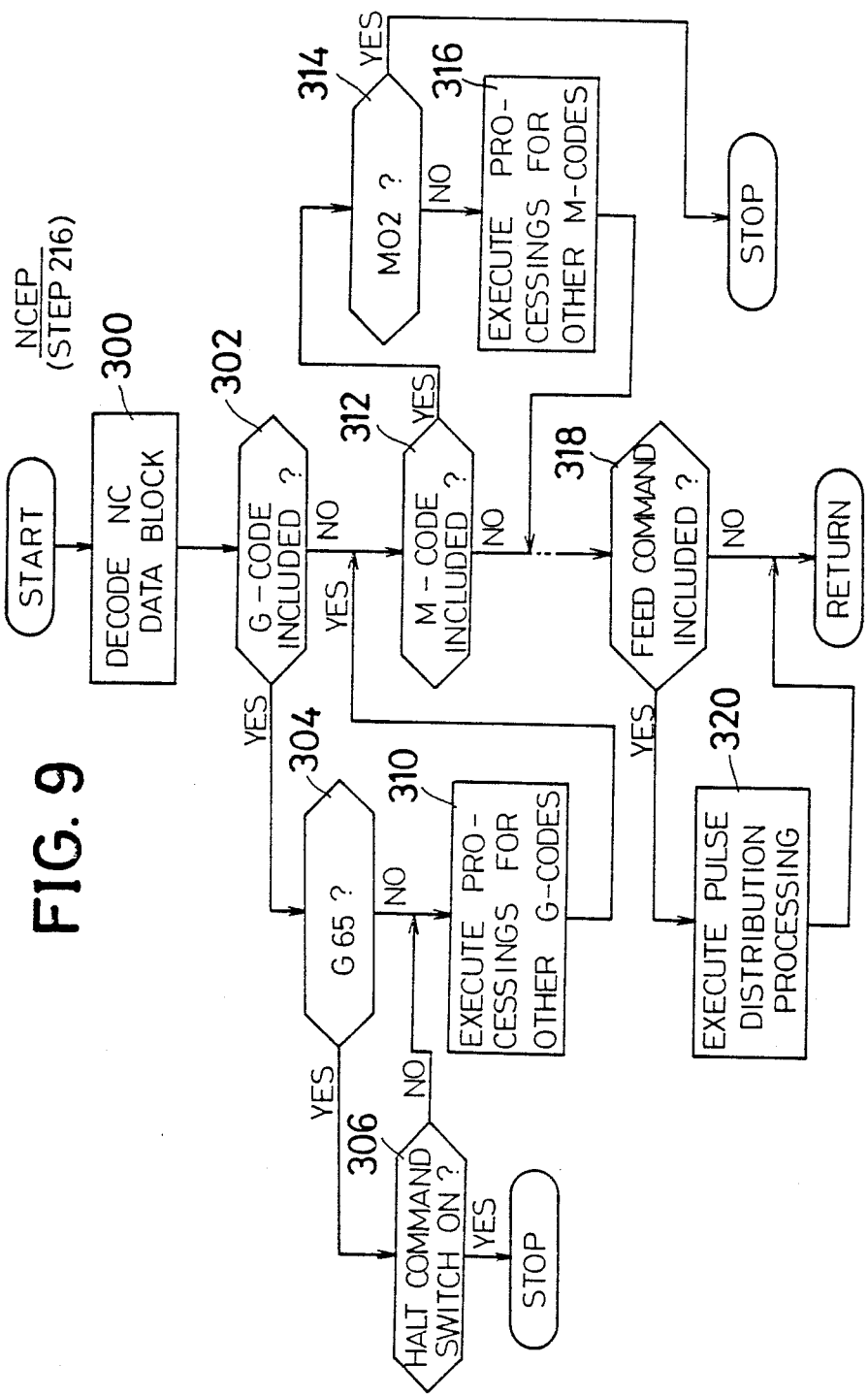
FIG. 9 is a specific flow chart of a numerical control execution program executed in step 216 of FIG. 5.

FIG. 9 is a flow chart illustrative of the program NCEP. After decoding of the NC data block in step 300, it is ascertained though steps 302 and 304 that the NC data block includes the halt command code G65, and the routine is then advanced to step 306 to further ascertain whether the switch 41 assigned to the code G65 is ON or not. If it is ON, the halt command code G65 is valid, whereby the automatic machining operation in accordance with the NC program is halted. During this halt, the CPU 21 executes a compensation value input program CVIP shown in FIG. 10. However, if the switch 41 is OFF, the halt command code G65 is invalidated. When any other command than the halt command code G65 is ascertained, appropriate processings in other steps 310-320 are executed, whereby a pulse distribution processing is executed in response to the ascertained command to feed the wheel head 11 and/or the table 13 or whereby an auxiliary control processing designated by the ascertained command is executed to effect an auxiliary control such as work spindle start/-stop, coolant supply start/stop, or the like. When a program end is ascertained in step 314, the automatic operation is terminated.

After the automatic machining operation is halted as described earlier, the operator depresses the retraction command switch S2. This results in distributing a predetermined number of retraction feed pulses to the drive circuit 16, whereby the wheel head 11 is retracted a predetermined distance. Thereafter, the data input device 36 is manipulated by the operator to execute the compensation value input program CVIP. This causes the CPU 21 to display a compensation value input image on the CRT display unit 38, as shown in FIG. 11. The operator then measures the diameter of the workpiece portion of which the automatic machining operation is presently halted. At this time, the input image on the CRT display unit 38 indicates as the wheel head stop position X0 a position where the advance feed of the wheel head 11 was halted. For desired finish diameters of the respective workpiece portions, the operator then calculates the difference between the displayed position data X0 and the measured diameter and inputs the calculated difference as a compensation value H0 common to all of the workpiece portions. Further, if need be, the operator inputs other compensation values H1-H10 individual to the respective workpiece portions. In determining these individual compensation values H1-H10, consideration is taken into a flexing amount of the workpiece W and a wear amount of the grinding wheel G during the machining on the workpiece portion. Usually, the individual compensation value H1 for the first workpiece portion is set to be zero, and other individual compensation values H2-H10 are set to several micron meters although they depend upon the rigidity of the workpiece W, the wear characteristic of the grinding wheel G and other factors. The common compensation value H0 is stored in a B-DATA storage portion (FIG. 3) of the parameter area PA assigned to the parameter B39 in step 412, while the individual compensation values H1-H10 are stored in step 410 in respective memory addresses which are formed for the parameter C46 in C-DATA storage portions of the parameter area PA. The C-DATA storage portions are assigned to the respective workpiece portions for storing various C-parameters therefor. In this manner, after the completion of the rough grinding infeed, the common compensation value H0 and the individual compensation values H1-H10 are input for desired or programmed finish diameters of the respective workpiece portions.

Upon completion of inputting the compensation values H0-H10, the operator depresses the advance command switch S3. Advance feed pulses of the predetermined number are thus distributed to the drive circuit 16, whereby the wheel head 11 is precisely returned to the same position where the automatic machining operation was halted. When the restart command switch S4 is then depressed, the automatic machining operation is resumed from step 202 of FIG. 5. As noted from FIG. 2, an NC data block with sequence number N104 defines the wheel head advanced position (X) in the fine grinding as the sum of parameters C40, B39, C46 and C12 which respectively represent a finish radius of the first stepped workpiece portion, a common compensation value, an individual compensation value and an allowance in the fine grinding. Each of the parameters B39 and C46 is usually set to be zero right after the preparation of the NC program. However, as a result of the common and individual compensation values H0-H10 being input as the parameters B39 and C46 after the rough grinding as described earlier, the infeed end of the wheel head 11 in the fine grinding is changed by the compensation values B39 and C46 (i e., the feed amount in the fine grinding is changed by the compensation values B39, C46). Similarly, when a microgrinding is then effected in accordance with another NC data block with sequence number N106, the infeed end of the wheel head 11 is changed by the compensation values B39 and C46. Consequently, the first workpiece portion can be precisely machined to a desired diameter, and the same is true with the second workpiece portion and those successive thereto. This means that in the case where a plurality of workpieces each having a single machining portion are successively machined, all of them are precisely machined to the same or respective diameters without having the first workpiece machined to an undesirable diameter.

As is clear from the foregoing description, the halt command code G65 can be inserted between any successive two NC data blocks, and the feed modification function specified by the code G65 can be validated or invalidated by the switch 41 or 42 on the manipulation panel 35. With respect to those prepared for the first workpiece portion, of the NC program shown in FIG. 2, the halt command code G65 is inserted next to each of the data blocks for the rough and fine grinding infeeds. However, whether to halt the automatic machining operation in response to each halt command code G65 or not depends the statuses of the switches 41 and 4 during the automatic machining operation.

Although in the above-described embodiment, a compensation value is used to adjust the advanced end position of each of several plunge infeed segments (i.e., fine and finish grinding feeds), it may otherwise be used to adjust only an advanced end position of a final plunge infeed segment.

Further, it is to be noted that the present invention is not limited to such a numerical controller that uses NC programs including parameters instead of real feed data. A convention numerical controller which does not use parameters unlike that in the above-described embodiment can be used in paracticing the present invention.

Obviously, numerous modifications and variations of the present invention are possible in light of the above teachings. It is therefore to be understood that within the scope of the appended claims, the present invention may be practiced otherwise than as specifically described herein.

What is claimed is:

1. A numerical controller for a grinding machine wherein a rotating cylindrical workpiece is ground by effecting relative feed movement between a grinding wheel and said workpiece, said numerical controller comprising:

data storage means for storing a numerical control program instructing an automatic machining operation wherein first and second plunge infeeds are successively effected between said grinding wheel and said workpiece, said numerical control program being composed of a plurality of numerical control data blocks, wherein a halt command is included in a data block between a data block including a feed command for said first plunge infeed and a data block including a feed command for said second plunge infeed:

buffer register means;

an active register;

first data transfer means for transferring a numerical control data block stored in said buffer register to said active register;

second data transfer means for transferring another numerical control data block from said data storage means to said buffer register means each time said data transfer means operates;

feed control execution means for controlling relative feed movement between said grinding wheel and said workpiece in accordance with the numerical control data block stored in said active register;

halt control means for halting said automatic machining operation when one of said numerical control data blocks including said halt command is transferred to said active register;

compensation data input means for enabling compensation data to be input while said automatic machining operation is halted by said halt control means;

data modification means for modifying feed command data of said numerical control program based upon said compensation data input by said compensation data input means, and for re-storing said modified feed command data in said data storage means;

restart command means for generating a restart command after said compensation data is input; and restart control means responsive to said restart command from said restart command means for enabling said second data transfer means to transfer to said buffer register means a modified numerical control data block which is successive to said numerical control data block including said halt command.

2. A numerical controller as set forth in claim 1, further comprising:

advance read inhibition means for inhibiting said second data transfer means from transferring any numerical control data block to said buffer register means after said numerical control data block including said halt command is transferred to said buffer register means.

3. A numerical controller as set forth in claim 2, wherein said advance read inhibition means comprises:

ascertaining means for ascertaining whether any numerical control data block transferred by said second data transfer means from said data storage means to said buffer register means includes said halt command or not;

inhibition flag means operable when the inclusion of said halt command in said any numerical control data block is ascertained by said ascertaining means; and means responsive to the operation of said inhibition flag means for inhibiting said second data transfer means from operating.

4. A numerical controller as set forth in claim 1, further comprising:

halt command means for selectively validating and invalidating said halt command included in one of said numerical control data blocks;

said halt control means being operable for halting said automatic machining operation when said one of said numerical control data blocks including said halt command is transferred to said active register and when said halt command means is in such a state as to validate said halt command.

5. A numerical controller as set forth in claim 4, further comprising:

advance read inhibition means for inhibiting said second data transfer means from operating after said one of said numerical control data blocks including said halt command is transferred to said buffer register means when said halt command means is in such a state as to validate said halt command.

6. A numerical controller as set forth in claim 5, wherein said advance read inhibition means comprises:

first ascertaining means for ascertaining whether any numerical control data block transferred by said second data transfer means from said data storage means to said buffer register means includes said halt command or not;

second ascertaining means for ascertaining whether said halt command means is in such a state as to validate said halt command or not;

inhibition flag means operable when the inclusion of said halt command in said any numerical control data block is ascertained by said first ascertaining means and when said halt command means is ascertained by said second ascertaining means to be in such a state as to validate said halt command; and means responsive to the operation of said inhibition flag means for disabling said second data transfer means from operating.

7. A numerical controller as set forth in claim 6, wherein said restart control means includes:

means responsive to said restart command from said restart command means for resetting said inhibition flag means so as to enable said second data transfer means to operate.

8. A numerical controller as set forth in claim 1, wherein said numerical control program is composed of traverse feed data blocks prepared for aligning said grinding wheel selectively with a plurality of axially stepped portions of said workpiece and a plurality of plunge feed data blocks prepared for effecting said first and second plunge infeeds between said grinding wheel and each of said workpiece portions aligned therewith, wherein said compensation data input means is operable to input a common compensation value and a plurality of individual compensation values, and wherein said data modification means comprises:

first modification means for modifying based on said common compensation value said plunge feed data blocks so as to change a feed end position in said second plunge infeed performed in grinding each of said workpiece portions; and second modification means for modifying based on one of said individual compensation values said plunge feed data blocks so as to change said feed end position in said second plunge infeed performed in grinding one of said workpiece portions which is given said one of said individual compensation values.

9. A numerical controller as set forth in claim 8, wherein:

each of said plunge feed data blocks includes a grinding wheel feed command and several parameters;

said data storage device stores real values represented by said several parameters;

said first modification means is operable to modify based upon said common compensation value one of said real values which is represented by one of said parameters included in each of said plunge feed data blocks; and said second modification means is operable to modify based upon one of said individual compensation values another of said real values which is represented by another of said parameters included in each of said plunge feed data blocks.

10. A numerical controller as set forth in claim 9, futher comprising:

data conversion means operable prior to the operation of said second data transfer means for converting each plunge feed data block which is to be next transferred to said buffer register means, into real values instead of said several parameters respectively representing said real values.

* * * * *